(12) United States Patent
Ting et al.

(10) Patent No.: US 7,803,724 B2
(45) Date of Patent: Sep. 28, 2010

(54) MULTILAYER AIRBAG USING NON-WOVEN FABRIC AND REINFORCED SCRIM

(75) Inventors: Yuan-Ping R. Ting, Plainsboro, NJ (US); Jerome L. Buchanan, Easton, PA (US)

(73) Assignee: Honeywell International Inc., Morristown, NJ (US)

( * ) Notice: Subject to any disclaimer, the term of this patent is extended or adjusted under 35 U.S.C. 154(b) by 790 days.

(21) Appl. No.: 11/809,050

(22) Filed: May 30, 2007

(65) Prior Publication Data

US 2007/0278775 A1 Dec. 6, 2007

Related U.S. Application Data

(60) Provisional application No. 60/810,463, filed on Jun. 2, 2006.

(51) Int. Cl.
*B32B 15/01* (2006.01)
(52) U.S. Cl. ....................... 442/16; 280/728.1
(58) Field of Classification Search .............. 280/728.1, 280/743.1; 428/34.1, 34.6, 34.7, 35.7, 35.9, 428/36.1, 36.2, 36.9, 36.91; 442/1, 11, 13, 442/16, 19, 26, 27, 43
See application file for complete search history.

(56) References Cited

U.S. PATENT DOCUMENTS

| 5,322,322 A | 6/1994 | Bark et al. ............... 280/730.2 |
| 5,322,326 A | 6/1994 | Ohm ........................ 280/737 |
| 5,390,950 A | 2/1995 | Barnes et al. ............ 280/728.3 |
| 5,452,914 A | 9/1995 | Hirai ....................... 280/743.1 |
| 5,480,181 A | 1/1996 | Bark et al. ............... 280/730.2 |
| 5,505,485 A | 4/1996 | Breed ........................ 280/729 |
| 5,632,914 A | 5/1997 | Hagenow et al. ....... 219/121.71 |
| 5,653,462 A | 8/1997 | Breed et al. ................. 280/735 |
| 5,653,464 A | 8/1997 | Breed et al. |
| 5,746,446 A | 5/1998 | Breed et al. |
| 5,772,238 A | 6/1998 | Breed et al. ............... 280/728.2 |
| 5,842,716 A | 12/1998 | Breed ........................ 280/734 |
| 6,715,790 B2 | 4/2004 | Breed ...................... 280/730.2 |
| 2007/0065614 A1 | 3/2007 | Schulthess |

FOREIGN PATENT DOCUMENTS

| WO | WO9737874 | 10/1997 |
| WO | WO0168408 | 9/2001 |
| WO | WO03051681 | 6/2003 |

*Primary Examiner*—Arti Singh-Pandey

(57) ABSTRACT

Vehicular air bags formed from multilayer composites. The multilayer composites include a polymeric film and at least one tear resistant fabric attached to the polymeric film, and more particularly include a polymeric film, an open mesh, tear resistant fabric attached to the film and a fabric layer attached to the open mesh, tear resistant fabric. Air bags formed therefrom have low base weight, low elongation and high tear propagation resistance, protecting vehicle occupants from injury during and after air bag deployment.

15 Claims, No Drawings

MULTILAYER AIRBAG USING NON-WOVEN FABRIC AND REINFORCED SCRIM

CROSS REFERENCE TO RELATED APPLICATION

This application claims the benefit of U.S. provisional application No. 60/810,463 filed on Jun. 2, 2006, which is incorporated herein by reference in its entirety.

BACKGROUND OF THE INVENTION

1. Field of the Invention

The present invention relates to air bags formed from multilayer composites, which air bags are particularly useful as a side curtain air bag arranged to deploy along the inside of a vehicle. The air bags of the invention have low base weight, low elongation and high tear propagation resistance, which protect vehicle occupants from injury during and after air bag deployment.

2. Description of the Related Art

It is a known problem in the art of producing vehicular air bags that physical damage to the air bag can result in failure of the bag when deployed, potentially subjecting vehicle occupants to catastrophic injury. For example, tears in polymeric air bags propagate easily, causing the air bag to burst when inflated or fail to perform properly. In order to overcome this problem, it is necessary to manufacture air bags from materials that are resistant to tear propagation. Accordingly, it has been known to manufacture air bags from a woven material such as nylon or polyester. The woven material is frequently coated with silicon or neoprene rubber to seal the air bag and to capture particles emitted by the bag inflator. However, such materials have substantial mass and can cause a vehicle occupant to be injured when struck by an inflating air bag.

In addition to tear propagation resistance, it is important that air bags have both a low mass and low elongation in order to protect a vehicle occupant from injury. Accordingly, there is a need in the art for a lightweight air bag structure having good physical properties. The present invention provides a solution to this need.

SUMMARY OF THE INVENTION

The invention provides an air bag for a vehicle, the air bag comprising a multilayer composite which comprises:
  a) a polymeric film;
  b) an open mesh, tear resistant fabric attached to the film;
  c) an adhesive layer positioned between said polymeric film and said open mesh, tear resistant fabric; and
  d) a fabric layer attached to the open mesh, tear resistant fabric.

The invention also provides an air bag for a vehicle, the air bag comprising a multilayer composite which comprises:
  a) a biaxially oriented polymeric film;
  b) at least one tear resistant fabric attached to the biaxially oriented polymeric film; and
  c) an adhesive layer on said biaxially oriented polymeric film and positioned between said biaxially oriented polymeric film and said tear resistant fabric.

The invention further provides a method for forming an air bag comprising:
  a) applying an adhesive layer onto a polymeric film;
  b) positioning an open mesh, tear resistant fabric onto said polymeric film, such that said adhesive layer is positioned between said polymeric film and said open mesh, tear resistant fabric;
  c) positioning a fabric layer onto the open mesh, tear resistant fabric, wherein the adhesive layer is capable of contacting the fabric layer through said open mesh, tear resistant fabric;
  d) laminating said polymeric film, adhesive layer, open mesh, tear resistant fabric and fabric layer to form a composite; and
  e) overlapping said composite onto itself and sealing said fabric layer to itself to form an air bag.

The invention also provides a method for forming an air bag comprising:
  a) attaching a biaxially oriented polymeric film to at least one tear resistant fabric via an intermediate adhesive layer, forming a composite; and
  b) overlapping said composite onto itself and sealing said tear resistant fabric to itself to form an air bag.

DETAILED DESCRIPTION OF THE INVENTION

The multilayer composites from which the air bags of the invention are formed include at least one polymeric film layer attached to at least one tear resistant fabric. Particularly, the polymeric film preferably comprises the outermost layer of the air bag structure, while the heat sealable tear resistant fabric (or any additional layer attached thereto, e.g. a thermoplastic or fiberglass layer) will preferably form the innermost layer of the air bag structure. The polymeric film layer preferably comprises a polymer exhibiting high puncture resistance and an elongation at break of less than 150% in both the longitudinal (machine) direction and transverse direction, as determined by the procedures of ASTM D882.

Suitable polymers for forming the polymeric layer non-exclusively include polyamides (nylons), polyesters, polyolefins and fluoropolymers.

Suitable nylons within the scope of the invention non-exclusively include homopolymers or copolymers selected from aliphatic polyamides and aliphatic/aromatic polyamides having a molecular weight of from about 10,000 to about 100,000. General procedures useful for the preparation of polyamides are well known to the art.

Useful polyamide homopolymers include poly(4-aminobutyric acid) (nylon 4), poly(6-aminohexanoic acid) (nylon 6, also known as poly(caprolactam)), poly(7-aminoheptanoic acid) (nylon 7), poly(8-aminooctanoic acid) (nylon 8), poly(9-aminononanoic acid) (nylon 9), poly(10-aminodecanoic acid) (nylon 10), poly(11-aminoundecanoic acid) (nylon 11), poly(12-aminododecanoic acid) (nylon 12), while useful copolymers include nylon 4,6, poly(hexamethylene adipamide) (nylon 6,6), poly(hexamethylene sebacamide) (nylon 6,10), poly(heptamethylene pimelamide) (nylon 7,7), poly(octamethylene suberamide) (nylon 8,8), poly(hexamethylene azelamide) (nylon 6,9), poly(nonamethylene azelamide) (nylon 9,9), poly(decamethylene azelamide) (nylon 10,9), poly(tetramethylenediamine-co-oxalic acid) (nylon 4,2), the polyamide of n-dodecanedioic acid and hexamethylenediamine (nylon 6,12), the polyamide of dodecamethylenediamine and n-dodecanedioic acid (nylon 12,12) and the like. Other useful aliphatic polyamide copolymers include caprolactam/hexamethylene adipamide copolymer (nylon 6,6/6), hexamethylene adipamide/caprolactam copolymer (nylon 6/6,6), trimethylene adipamide/hexamethylene azelaiamide copolymer (nylon trimethyl 6,2/6,2), hexamethylene adipamide-hexamethylene-azelaiamide caprolactam copolymer (nylon 6,6/6,9/6) and the like. Also included are other nylons which are not particularly delineated here.

Of these polyamides, preferred polyamides include nylon 6, nylon 6,6, nylon 6/6,6 as well as mixtures of the same. Of these, nylon 6 is most preferred.

Aliphatic polyamides used in the practice of this invention may be obtained from commercial sources or prepared in accordance with known preparatory techniques. For example, poly(caprolactam) can be obtained from Honeywell International Inc., Morristown, N.J. under the trademark CAPRON®.

Exemplary of aliphatic/aromatic polyamides include poly(tetramethylenediamine-co-isophthalic acid) (nylon 4,I), polyhexamethylene isophthalamide (nylon 6,I), hexamethylene adipamide/hexamethylene-isophthalamide (nylon 6,6/6I), hexamethylene adipamide/hexamethyleneterephthalamide (nylon 6,6/6T), poly (2,2,2-trimethyl hexamethylene terephthalamide), poly(m-xylylene adipamide) (MXD6), poly(p-xylylene adipamide), poly(hexamethylene terephthalamide), poly(dodecamethylene terephthalamide), polyamide 6T/6I, polyamide 6/MXDT/I, polyamide MXDI, and the like. Blends of two or more aliphatic/aromatic polyamides can also be used. Aliphatic/aromatic polyamides can be prepared by known preparative techniques or can be obtained from commercial sources. Other suitable polyamides are described in U.S. Pat. Nos. 4,826,955 and 5,541,267, which are incorporated herein by reference.

The most preferred polyester is polyethylene terephthalate, the most preferred polyolefin is polypropylene and the most preferred fluoropolymer is ethylene-chlorotrifluoroethylene (ECTFE), which exhibits excellent fire retardance. The polymeric film layer may be formed using commonly known techniques, and is preferably formed by extrusion. In a conventional extrusion process, the polymeric material for the layer (or layers) is fed into one or more infeed hoppers of a like number of extruders, each extruder handling the material for one or more of the layers. The melted and plasticated streams from the individual extruders are fed into a single manifold extrusion die. After exiting the die, the film is cast onto a first controlled temperature casting roll, passes around the first roll, and then onto a second controlled temperature roll, which is normally cooler than the first roll. The controlled temperature rolls largely control the rate of cooling of the film after it exits the die. Additional rolls may be employed. In another method, the film forming apparatus may be one which is referred to in the art as a blown film apparatus and includes a circular die head for bubble blown film through which the plasticized film composition is forced and formed into a film bubble which may ultimately be collapsed and formed into a film. Processes of coextrusion to form film and sheet laminates are generally known. Typical coextrusion techniques are described in U.S. Pat. Nos. 5,139,878 and 4,677,017.

In the preferred embodiment of the invention, when a non-fluoropolymer polymeric film is incorporated, the polymeric film is preferably biaxially oriented. Preferably, in the present invention the film nylon film is oriented to a draw ratio of from 1.5:1 to 5:1 biaxially in each of its machine (longitudinal) direction and transverse direction. For the purposes of the present invention the term draw ratio is an indication of the increase in the dimension in the direction of draw. Preferably, the film is simultaneously biaxially oriented, for example orienting a plasticized film in both the machine and transverse directions at the same time. This results in dramatic improvements in strength and toughness properties. It is generally not necessary to orient an ECTFE layer. In the most preferred embodiment of the invention, the polymeric film comprises either a biaxially oriented nylon or a biaxially oriented polypropylene layer. The polymeric film may also optionally be perforated to control deflation of the air bag after deployment. Methods of perforation are well known in the art. See, for example, U.S. Pat. No. 5,632,914, the disclosure of which is incorporated herein by reference.

As used herein, a tear resistant fabric refers to both the open mesh, tear resistant fabric and the fabric layer. Such tear resistant layers preferably have a tear resistance of greater than 100 g/inch. In general, when the polymeric film is biaxially oriented, both the open mesh fabric and the fabric layer are not required. In the preferred embodiment of the invention, the composite structure includes both of said components, even when the polymeric film is biaxially oriented. As used herein, an open mesh, tear resistant fabric refers to a net-like fabric structure, or a scrim, comprising woven or non-woven polymeric fibers. The term scrim, as used herein, is used to describe any type of open mesh structure that is either woven or non-woven. Woven scrims may have any type of weave, and non-woven scrims are produced using any well known technique, including spun lace and spun bond techniques. Suitable polymeric fibers used to produce the scrim non-exclusively include polyamides, polyesters and polyolefins, particularly polyethylene and polypropylene, or a combination thereof. The open mesh fabric may also comprise fiberglass. Most preferably, the open mesh fabric comprises at least one nylon, a high density polyethylene or a combination thereof. A preferred high density polyethylene has a low degree of side chain branching, a density of greater or equal to 0.941 g/cc and a specific gravity between 0.945 and 0.967 g/cc. The open mesh fabric may embody multiple overlapped plies, preferably, the scrim includes from about 2 to about 5 overlapped plies. Open mesh fabric or scrims formed from said materials are tear resistant in both the longitudinal (machine) and transverse directions. Suitable scrims are commercially available from, for example, Atlanta Nisseki CLAF, Inc. of Kennesaw, Ga.

The open mesh fabric is preferably attached to the polymeric film via an intermediate adhesive layer. The adhesive is preferably applied directly onto the polymeric film by any appropriate means, such as by coating. Suitable adhesives non-exclusively include ethylene vinyl acetate, polyurethanes, epoxies, polyesters, acrylics, anhydride modified polyolefin and blends thereof. Modified polyolefin compositions have at least one functional moiety selected from the group consisting of unsaturated polycarboxylic acids and anhydrides thereof. Such unsaturated carboxylic acid and anhydrides include maleic acid and anhydride, fumaric acid and anhydride, crotonic acid and anhydride, citraconic acid and anhydride, itaconic acid an anhydride and the like. The most preferred adhesive layers comprise ethylene vinyl acetate or a one or two component urethane. Preferred urethane based adhesives are commercially available, for example, from COIM, based in Italy.

It is also within the scope of the invention that the polymeric film may be subjected to an optional corona treatment to improve the interlayer adhesion between the adhesive layer and the polymeric film. A corona treatment is a process in by which a layer of material is passed through a corona discharge station giving the surface of the layer a charge that improves its ability to bond to an adjacent layer. If conducted, it is preferably done in-line prior to attachment of the adhesive layer and is conducted on the polymeric film surface to which the adhesive layer will be attached. Preferably, the polymeric film is subjected to about 0.5 to about 3 kVA-min/m² of corona treatment. More preferably, the corona treatment level is about 1.7 kVA-min/m². Suitable corona treatment units are commercially available from Enercon Industries Corp., Menomonee Falls, Wis. and from Sherman Treaters Ltd, Thame, Oxon.; UK. The most preferred polymeric film comprises a corona treated, biaxially oriented polyamide film.

In a preferred embodiment of the invention, a fabric layer is attached to the surface of the open mesh fabric opposite the adhesive layer. While both an open mesh layer and a fabric layer are not mandatory, it is most preferred that both layers are present in the composites of the invention. The fabric layer may be either a woven or non-woven fabric. Preferably, the fabric layer is non-woven. It has been found that the application of a non-woven fabric layer together with the open mesh fabric produces a composite having reduced noise. Suitable materials for producing the fabric layer non-exclusively include polyamides, polyesters, and polyolefins, particularly polypropylene and polyethylene. Most preferably, the fabric layer comprises a material which is heat sealable, such as polypropylene or heat sealable nylons. Similar to the open mesh fabric, the fabric layer may be produced by commonly known fabric forming techniques, including spun bond or spun lace techniques, such that it may be applied as a continuous roll. The fabric layer may also comprise a fusible material which is set in a polymeric matrix, or binder, composition. Suitable matrixes for use herein non-exclusively include low modulus polymers, such as low modulus elastomers.

It is also within the scope of the invention that additional thermoplastic polymeric layers may be attached to the outer surface of the tear resistant fabric layer. Suitable additional polymeric layers may comprise a wide variety of materials which are incorporated to add further desired properties to the composite. For example, the thermoplastic polymer layer may comprise a polyamide, a polyolefin, a polyvinylidene chloride, or a combination thereof. Polyvinylidene chloride, for example, provides increased puncture resistance as well as heat sealability.

In view of the above, the present invention provides a variety of air bag structures that achieve the aforementioned goals. The following illustrative structures are particularly preferred embodiments of the invention, each having excellent puncture resistance, tear resistance and heat seal capability:

Structure A: Biaxially Oriented Nylon/Adhesive/Non-Woven Polypropylene

The biaxially oriented nylon has a preferred thickness of 60 gauge (ga), with a preferred nylon thickness range of about 48 gauge (ga) to 100 ga (1 ga=0.254 μm). The adhesive is preferably two parts urethane with a coating weight of from about 1 lb to about 4 lbs per ream or an ethylene vinyl acetate (EVA) base hot melt adhesive with a coating weight from about 1 g/m² (gsm) to about 8 gsm. The non-woven polypropylene is used for its good tear resistance and heat seal capability. It has a preferred base weight of 25 gsm with a range from about 9 gsm to about 90 gsm.

Structure B: Biaxially Oriented Nylon/Adhesive/Scrim/Non-Woven Polypropylene

The biaxially oriented nylon has a preferred thickness of 60 ga, with a preferred nylon thickness range of about 48 ga to 100 ga. The adhesive is preferably two parts urethane with a coating weight of from about 1 lb to about 4 lbs per ream or an EVA base hot melt adhesive with a coating weight from about 1 gsm to about 8 gsm. The scrim is used for its good tear resistance and for preventing elongation. Preferred scrim materials include polyethylene, nylon, and fiberglass with a base weight of 0.53 oz/yd² to 1.5 oz/yd². A preferred scrim is SS-1601 from Atlanta Nisseki CLAF, Inc. The non-woven polypropylene has a preferred base weight of 25 gsm with a range from about 9 gsm to about 90 gsm.

Structure C: Biaxially Oriented Nylon/Adhesive/Extrusion Coated Scrim with 1 mil Polyethylene The biaxially oriented nylon has a preferred thickness of 48 ga with a preferred nylon thickness range of about 48 ga to 100 ga. The adhesive is preferably two parts urethane with a coating weight of from about 1 lb to 4 lbs per ream. The extrusion coated scrim with 1 mil polyethylene is commercially available from Atlanta Nisseki CLAF, Inc. (extrusion coated SS1602 scrim with 1 mil PE), and is used for its good tear resistance and heat seal capability.

Structure D: Biaxially Oriented Nylon/Adhesive/Dupont Tyvek® Fabric

The biaxially oriented nylon has a preferred thickness of 60 ga with a preferred nylon thickness range of about 48 ga to 100 ga. The adhesive is preferably two parts urethane with a coating weight of from about 1 lb to 4 lbs per ream. The Dupont TYVEK® fabric is a non-woven high density polyethylene having good tear resistance and heat seal capability.

Structure E: Biaxially Oriented Nylon/Adhesive/VALERON® Film

The biaxially oriented nylon has a preferred thickness of 60 ga with a preferred nylon thickness range of about 48 ga to 100 ga. The adhesive is preferably two parts urethane with a coating weight of from about 1 lb to 4 lbs per ream. VALERON® film (commercially available from Illinois Tool Works, Inc. of Glenview, Ill.) film is a cross-laminated high density polyethylene, preferably two cross-laminated, machine direction oriented HDPE films having good tear resistance and heat seal properties.

Each of the polymeric film and the adhesive layer may optionally also include one or more conventional additives whose uses are well known to those skilled in the art. The use of such additives may be desirable in enhancing the processing of the compositions as well as improving the products or articles formed therefrom. Examples of such include: oxidative and thermal stabilizers, lubricants, release agents, flame-retarding agents, oxidation inhibitors, oxidation scavengers, dyes, pigments and other coloring agents, ultraviolet light absorbers and stabilizers, organic or inorganic fillers including particulate and fibrous fillers, reinforcing agents, nucleators, plasticizers, as well as other conventional additives known to the art. Representative ultraviolet light stabilizers include various substituted resorcinols, salicylates, benzotriazole, benzophenones, and the like. Suitable lubricants and release agents include stearic acid, stearyl alcohol, and stearamides. Exemplary flame-retardants include inorganic compounds, such as zinc borate, alumina hydrate (aluminum trihydroxide), magnesium hydroxide, ammonium polyphosphate and red phosphorus, organic halogenated compounds, including decabromodiphenyl ether, decabromodiphenyl oxide (such as GREAT LAKES DE-83R™, commercially available from Chemtura Corporation of Middlebury, Conn.), pentabromodiphenyl oxide (such as GREAT LAKES DE-71™), tribromophenyl allyl ether (such as GREAT LAKES PHE-65™), hexabromocyclododecane (such as GREAT LAKES CD-75P™), triphenyl phosphate, and the like. Suitable coloring agents including dyes and pigments include cadmium sulfide, cadmium selenide, titanium dioxide, phthalocyanines, ultramarine blue, nigrosine, carbon black and the like. Representative oxidative and thermal stabilizers include the Period Table of Element's Group I metal halides, such as sodium halides, potassium halides, lithium halides; as well as cuprous halides; and further, chlorides, bromides, iodides. Also, hindered phenols, hydroquinones, aromatic amines as well as substituted members of those above mentioned groups and combinations thereof. Exemplary plasticizers include lactams such as caprolactam and lauryl lactam, sulfonamides such as o,p-toluenesulfonamide and N-ethyl, N-butyl benylnesulfonamide, and combinations of any of the above, as well as other plasticizers known to the art. These additives may be used in amounts, for example, of up to about 10% by weight of the layer. Additives to an adhesive layer may be used in amounts of from about 5% to about 50% by weight, preferably about 10% by weight of the adhesive layer. Additionally, one or more layers of the composite may be treated with a polymer surface coating having desired properties, such as a polymer coating containing a colorant or a polymer coating having flame retardant properties, such as a nylon, or an intumescent material.

The multilayer composites of the invention are preferably formed using lamination techniques that are well known in the art. Typically, laminating is done by positioning the individual layers on one another under conditions of sufficient heat and pressure to cause the layers to combine into a unitary film. Typically the component films are positioned on one another, and the combination is passed through the nip of a pair of heated laminating rollers by techniques well known in the art. In the preferred embodiment of the invention, only a single adhesive layer is necessary since the adhesive composition is able to pass through the voids in the open mesh fabric into direct contact with the fabric layer. Lamination heating may be done at oven temperatures ranging from about 100° F. (37.78° C.) to about 300° F. (148.9° C.), preferably from about 150° F. (65.56° C.) to about 250° F. (121.1° C.), and more preferably at from about 180° F. (82.22° C.) to about 220° F. (104.4° C.), at nip pressures ranging from about 20 psi (137.9 kPa) to about 80 psi (551.6 kPa), more preferably from about 40 psi (275.8 kPa) to about 60 psi (413.7 kPa), with nip contact for from about 0.2 seconds to about 6 seconds, preferably from about 0.3 seconds to about 0.6 seconds. At the nip, the heating temperature preferably ranges from about 100° F. to about 300° F., more preferably from about 150° F. to about 250° F., and most preferably at from about 150° F. to about 180° F. The lamination of the combined layers should only require a single pass through the nip to join the component layers into a united composite.

Although each layer of the multilayer film structure may have a different thickness, the thickness of the polymeric layer is preferably from about 10 µm to about 50 µm, more preferably from about 12 µm to about 25 µm, and most preferably from about 12 µm to about 15 µm. The thickness of the open mesh, tear resistant fabric is preferably from about 75 µm to about 205 µm, more preferably from about 100 µm to about 150 µm and most preferably from about 100 µm to about 125 µm. The thickness of the fabric layer is preferably from about 50 µm to about 500 µm, more preferably from about 75 µm to about 250 µm, and most preferably from about 100 µm to about 200 µm. The thickness of the adhesive layer is preferably from about 1 µm to about 30 µm, more preferably from about 3 µm to about 20 µm, and most preferably from about 5 µm to about 15 µm. Further, any additional thermoplastic polymer layers preferably have a thickness of from about 5 µm to about 50 µm, more preferably from about 10 µm to about 40 µm and most preferably from about 15 µm to about 25 µm. The overall multilayer composite has a preferred total thickness of from about 135 µm to about 785 µm, more preferably from about 190 µm to about 445 µm and most preferably from about 215 µm to about 360 µm. While such thicknesses are preferred, it is to be understood that other film thicknesses may be produced to satisfy a particular need and yet fall within the scope of the present invention.

In the preferred embodiments of the invention, the scrim has a base weight (as determined by ASTM D3776) of from about 0.5 oz/yd$^2$ to about 1.3 oz/yd$^2$. More particularly, the scrim preferably comprises either the SS or the LS grade CLAF® materials available from Atlanta Nisseki CLAF, Inc., and preferably has the following properties per grade, of which the SS grade CLAF® scrim is most preferred:

| Scrim Material Base Weight | GSM | Oz/Yd$^2$ | lb/ream |
|---|---|---|---|
| SS grade | 18 | 0.53 | 11.0 |
| LS grade | 42 | 1.24 | 25.8 |

The fabric layer, preferably a heat sealable non-woven layer, has a preferred base weight of from about 9 gsm to about 90 gsm, more preferably from about 12 gsm to about 60 gsm, and most preferably from about 15 gsm to about 30 gsm. More particularly, the fabric layer preferably has the following properties, wherein the 25 gsm fabric is the most preferred:

| Fabric Material Base Weight | GSM | Oz/Yd$^2$ | lb/ream | |
|---|---|---|---|---|
| 9 gsm | 9 | 0.27 | 5.5 | Lowest |
| 90 gsm | 90 | 2.66 | 55.4 | Highest |
| 25 gsm | 25 | 0.74 | 15.4 | Most preferred |

The polymeric film, preferably a biaxially oriented nylon layer, has a yield of about 24,100 in$^2$/lb at 25 µm to about 50,900 in$^2$/lb at 12 µm. More particularly, the polymeric film preferably has the following properties, wherein a 60 ga biaxially oriented polyamide (BOPA) film is the most preferred:

| Film (in$^2$/lb) | Yield (in$^2$/lb) | GSM | oz/yd$^2$ | lb/ream | |
|---|---|---|---|---|---|
| 36 ga BOPA | 66944 | 10 | 0.31 | 6.5 | Lowest |
| 200 ga BOPA | 12050 | 58 | 1.72 | 35.9 | Highest |
| 60 ga BOPA | 40100 | 18 | 0.52 | 10.8 | Most Preferred |

The adhesive layer has a preferred coating weight of about 3 lbs. to about 6 lbs., more preferably from about 3.5 lbs. to about 4.5 lbs. More particularly, the adhesive layer preferably has the following properties, wherein a 4 lb/ream (ppr) film is the most preferred:

| Coating Weight (lb/ream) | lb/ream | GSM | Oz/yd$^2$ | |
|---|---|---|---|---|
| 2.5 ppr adhesive | 2.5 | 4 | 0.12 | Lowest |
| 6 ppr adhesive | 6 | 10 | 0.29 | Highest |
| 4 ppr adhesive | 4 | 7 | 0.19 | Preferred |

The final composites preferably have a low mass, an elongation of less than about 50%, preferably less than 30%, in both a longitudinal (machine) and a transverse directions, and have 50% or more base weight reduction compared to silicon coated woven fabric structures. More particularly, the final composites preferably have the following base weight properties when incorporating a scrim and utilizing a biaxially oriented polyamide as the polymeric film:

|  | Total Base Weight (BOPA + Scrim + Adhesive + Fabric) | | |
| --- | --- | --- | --- |
|  | Lowest | Highest | Preferred |
| GSM | 51 | 170 | 67 |
| oz/yd$^2$ | 1.5 | 5.0 | 2.0 |
| lb/ream | 32 | 105 | 41 |
| Yield (in$^2$/lb) | 4130 | 13634 | 10486 |

The final composites preferably have the following base weight properties when not a scrim is not incorporated and when utilizing a biaxially oriented polyamide as the polymeric film:

|  | Total Base Weight BOPA + Adhesive + Fabric) | | |
| --- | --- | --- | --- |
|  | Lowest | Highest | Preferred |
| GSM | 34 | 128 | 49 |
| oz/yd$^2$ | 1.0 | 3.8 | 1.4 |
| lb/ream | 21 | 79 | 30 |
| Yield (in$^2$/lb) | 5484 | 20925 | 14325 |

While the composite structures described herein may be useful for the formation of any variety of structures, the composites are particularly useful for the formation of air bags. Suitable methods of forming air bags and mounting air bags in vehicles are commonly known in the art. For example, suitable air bag systems, mechanisms and/or formation and mounting techniques are described in U.S. Pat. Nos. 5,322,322, 5,322,326, 5,390,950, 5,452,914, 5,480,181, 5,653,462, 5,505,485, 5,772,238, 5,842,716 and 6,715,790, each of which are incorporated herein by reference.

An air bag of the invention includes one or more composite structures described herein. If a single composite structure is used, the composite is preferably overlapped and heat sealed to itself to form a bag structure. Alternately, a second composite may be overlapped with the first such that the innermost layers, e.g. the open mesh, tear resistant fabric or the fabric layers, are overlapped and heat sealed together. The second composite is preferably of substantially similar construction to the first composite, including a second adhesive layer on a second polymeric film; a second open mesh, tear resistant fabric on a second polymeric film, a second adhesive layer positioned between the second polymeric film and the second open mesh, tear resistant fabric; and a second fabric layer on the second open mesh, tear resistant fabric, wherein the second adhesive layer is capable of contacting the second fabric layer through said second open mesh, tear resistant fabric.

While it is most preferable that the overlapping layers are heat sealed to each other, it should be understood that any alternate method may be used to attach the layers as would be conventionally understood by one skilled in the art. For example, the layers may be stitched or adhered together with an adhesive material.

In accordance with the invention, the polymeric film provides the composites with strength and puncture resistance, while the reinforcing scrim and fabric provide strength, structure and tear propagation resistance in both the machine and transverse directions. This composite structure has excellent physical properties, including high tensile strength, reduced noise, low elongation and burst resistance. The composites are also heat sealable and lightweight. Such composites may be used for the formation of both steering wheel and side impact air bags. As described, for example, in U.S. Pat. No. 6,715,790, an air bag for a vehicle may be formed from sections of the inventive composite material joined to one another such that interconnected compartments receivable of an inflating medium are formed. Two or more of the sections of material may be at least partially in opposed relationship to one another and then joined to one another at locations other than at a periphery of any of the sections to thereby form the interconnected compartments between the sections of material. The sections of material may also be joined to one another along parallel lines such that the interconnected compartments formed between the sections of material are elongate, i.e., substantially straight, and when inflated will be tubular. The air bag is mounted on a vehicle and may be sized to deploy along an entire side of the vehicle and also along a portion of the dashboard.

In a conventional air bag module, when the inflator is initiated, gas pressure begins to rise in the air bag which begins to press on the deployment door. When sufficient force is present, the door breaks open along certain well-defined weakened seams permitting the air bag to emerge from its compartment. The pressure in the air bag when the door opens, usually about 10 to 20 psi, is appropriate for propelling the air bag outward toward the occupant, the velocity of which is limited by the mass of the air bag.

The invention also provides an air bag system wherein the air bag is further coupled with an inflator (or inflatable element) for inflating said air bag with an inflating gas (or other fluid), and the bag is specifically designed to be receivable of the inflating gas. The inflator preferably comprises a suitable gas generator which generates said inflating gas. The air bag system further preferably includes a sensor operatively coupled to said inflator for sensing a crash condition requiring deployment of said air bag inflatable element and activating said inflator to supply gas for inflating said inflator upon sensing such a crash condition. The air bag system may further comprises a housing to hold each of the component parts of the air bag system. The multilayer composites of the invention are generally useful for application with any type of air bag system design, including the system described in U.S. Pat. No. 6,715,790.

The following non-limiting examples serve to illustrate the invention:

EXAMPLE 1

A composite having, in order, a 60 ga biaxially oriented nylon 6 layer, a 5 gsm hot melt adhesive layer (VERSA-WELD™ 34-3378 commercially available from National Starch and Chemical Company of Bridgewater, N.J.), and a 30 gsm non-woven polypropylene fabric structure was laminated in a single pass through a pressure nip and shaped into an air bag. The composite had a tear strength in the machine (longitudinal) direction of 736 g/laminate and 880 g/laminate in the transverse direction, as determined by the ASTM D1922-06a Elmendorf tear testing method.

EXAMPLE 2

A composite having, in order, a 60 ga biaxially oriented nylon 6 layer, a 5 gsm hot melt adhesive layer (VERSA-WELD™ 34-3378), a CLAF® SS 1602 scrim (0.53 oz), and a 30 gsm non-woven polypropylene fabric structure was laminated in a single pass through a pressure nip and shaped into an air bag. The composite had a very high tear strength, failing to tear at a maximum of 1600 g/laminate in both the machine direction and the transverse direction when tested by the ASTM D1922-06a Elmendorf tear testing method.

EXAMPLE 3

A composite having, in order, a 60 ga biaxially oriented nylon 6 layer, a 4 lb/ream polyurethane adhesive layer, a CLAF® LDPE/SS 1602 Scrim/LDPE film (2.6 oz), is laminated in a single pass through a heated nip and is shaped into an air bag.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiments, those alternatives which have been discussed above and all equivalents thereto.

What is claimed is:

1. An air bag for a vehicle, the air bag comprising a multi-layer composite which comprises:
   a) a biaxially oriented polymeric film;
   b) at least one tear resistant fabric attached to the biaxially oriented polymeric film; and
   c) an adhesive layer on the biaxially oriented polymeric film and positioned between the biaxially oriented polymeric film and the tear resistant fabric.

2. The air bag of claim 1 wherein the tear resistant fabric comprises an open mesh, tear resistant fabric.

3. The air bag of claim 1 wherein the tear resistant fabric comprises a non-woven fabric.

4. The air bag of claim 1 comprising both an open mesh, tear resistant fabric and a non-woven tear resistant fabric.

5. The air bag of claim 1 wherein the tear resistant fabric comprises a scrim.

6. The air bag of claim 1 wherein the biaxially oriented polymeric film comprises polyamides, polyolefins, polyesters, fluoropolymers or a combination thereof.

7. The air bag of claim 1 further comprising at least one thermoplastic polymer layer attached to an outer surface of the open mesh, tear resistant fabric.

8. The air bag of claim 7 wherein the thermoplastic polymer layer comprises polyamides, polyolefins, polyvinylidene chlorides, or a combination thereof.

9. The air bag of claim 2 wherein the open mesh, tear resistant fabric comprises at least one polyamide, polyolefin, polyester or a combination thereof.

10. The air bag of claim 3 wherein the non-woven fabric comprises polyamide fibers, polyolefin fibers, polyester fibers or a combination thereof.

11. A method for forming an air bag comprising:
    a) attaching a biaxially oriented polymeric film to at least one tear resistant fabric via an intermediate adhesive layer, forming a composite; and
    b) overlapping the composite onto itself and sealing the tear resistant fabric to itself to form an air bag.

12. The method of claim 11 wherein the tear resistant fabric comprises an open mesh, tear resistant fabric.

13. The method of claim 11 wherein the tear resistant fabric comprises a non-woven fabric.

14. The method of claim 11 comprising both an open mesh, tear resistant fabric and a non-woven tear resistant fabric.

15. The method of claim 11 wherein the tear resistant fabric is heat sealable to itself.

* * * * *